United States Patent [19]

Searle et al.

[11] Patent Number: 5,397,515
[45] Date of Patent: Mar. 14, 1995

[54] INJECTION MOLDING MACHINE TEMPERATURE CONTROL SYSTEM

[75] Inventors: John G. Searle; Brian P. Delaney; Kevin O. Delaney, all of Cuyahoga County; Keith M. Hogan, Lake County, all of Ohio; Peter B. Schmidt, Milwaukee, Wis.

[73] Assignee: Allen-Bradley Company, Inc., Milwaukee, Wis.

[21] Appl. No.: 968,808

[22] Filed: Oct. 30, 1992

[51] Int. Cl.⁶ .................. B29C 45/72; B29C 45/78
[52] U.S. Cl. ............................ 264/40.6; 425/144; 264/328.14; 364/476; 364/477; 366/145
[58] Field of Search ............ 264/40.1, 40.6, 328.14; 425/143, 144, 550; 366/145; 364/476, 477; 165/14

[56] References Cited

U.S. PATENT DOCUMENTS

| Re. 31,903 | 6/1985 | Faillace | 366/145 |
| 4,272,466 | 6/1981 | Harris | 366/145 |
| 4,843,576 | 6/1989 | Smith et al. | 364/477 |
| 5,149,193 | 9/1992 | Faillace | 366/145 |

*Primary Examiner*—Jill L. Heitbrink
*Attorney, Agent, or Firm*—Mark W. Pfeiffer; John J. Horn; H. F. Hamann

[57] ABSTRACT

A control system for controlling the temperature within process machinery such as the feed assembly in an injection molding machine. The control system provides a six phase process for starting up the machine from cold conditions and controlling the machine temperature to rapidly and accurately attain a command temperature while identifying control parameters for use under steady state conditions for maintaining the command temperature.

14 Claims, 10 Drawing Sheets

106

112

118

INJECTION MOLDING MACHINE TEMPERATURE CONTROL SYSTEM

BACKGROUND OF THE INVENTION

The present invention relates to injection molding machinery and more specifically to temperature control systems for use in an injection molding machine.

A typical injection molding machine includes a feed assembly having a barrel down which plastic materials are fed into a mold. The plastic materials are fed into the barrel in a solid granular state and are melted within the barrel for injection into the mold in a liquid state. The control of the temperature within the feed assembly is critical to the operation of the machine, and it is important that when the machine is started up from cold conditions, it is accurately and rapidly brought up to its set point temperature without significant overshoot. Additionally, it is a great benefit to identify parameters for use in the steady state control at the time of start up so that steady state control functions can be autotuned in accordance with operating conditions.

It is therefore an object of the present invention to provide a control system for use in controlling the temperature of the barrel in the feed assembly of an injection molding machine which has the capability of rapidly and accurately bringing up the barrel temperature to the command temperature under cold start up conditions.

It is another object of the present invention to provide a control system which enables rapid startup of injection molding machinery from cold conditions and which also provides autotuning of control parameters for use under steady state conditions during the cold startup procedure.

It is a further object of the present invention to provide a control program for execution by a programmable controller which allows for rapid and accurate cold startup of temperature machinery and sensitive identification of the control parameters for use under later steady state conditions during the cold start up procedure.

SUMMARY OF THE INVENTION

The present invention constitutes a system for controlling the temperature within process machinery such as the feed assembly of an injection molding machine to rapidly reach and accurately maintain a temperature set point (i.e. command temperature). The system includes a programmable controller which executes a program for regulating the power provided to heaters associated with the barrel of the machinery in response to temperature inputs from temperature transducers within the machinery. The control program includes six phases comprising different routines for acquiring control information and executing temperature control processes.

In the preferred embodiment, all six steps are sequentially executed in a cold start up procedure whereby the barrel of a feed assembly within an injection molding is rapidly and accurately brought up to its command temperature. In phase 1, the heaters installed on the barrel of the feed assembly are run at full power for a limited period of time in order to bring up the temperature of the barrel to an intermediate temperature and allow the system dead time to be determined. In phase 2 the power delivered to the heaters is ramped down over one dead time period to the zero power level. In phase 3 the power supplied to the heaters is maintained at the zero level until the barrel temperature peaks at a maximum temperature level. This temperature level is then associated with a power level during the down ramp of phase 2 which occurred one dead time period earlier whereby a steady state heater command value for the temperature maximum can be determined. Based on this steady state heater command value a system gain can be calculated and a steady state command value corresponding to the command temperature can be determined. Based on the system gain and other readily available temperature and time information, a system time constant is then calculated. The system gain, system time constant and system dead time are used in computing steady state control function parameters such as proportional and integral gain constants for later use in temperature control under steady state conditions. In phase 4 the heaters are run at full power for a short time interval which is related in duration to the steady state heater command value corresponding to the command temperature and the system dead time period (a heater command "spike") in order to rapidly push the barrel temperature up to the command temperature. In phase 5 the power delivered to the heaters is maintained at the steady state heater command value corresponding to the command temperature until the temperature results of the heater command value spike executed in phase 4 can begin to take effect. In phase 6, PI feedback and Smith Predictor control functions configured in accordance with parameters determined in phase 3 are used to maintain the barrel temperature at the command temperature in accordance with steady state conditions. The present invention allows the barrel temperature of an injection molding machine to be rapidly and accurately brought up to the command temperature while various steady state control parameters are simultaneously identified for use in autotuning the control functions used under steady state conditions.

DESCRIPTION OF THE PREFERRED EMBODIMENT

Figure 1A:
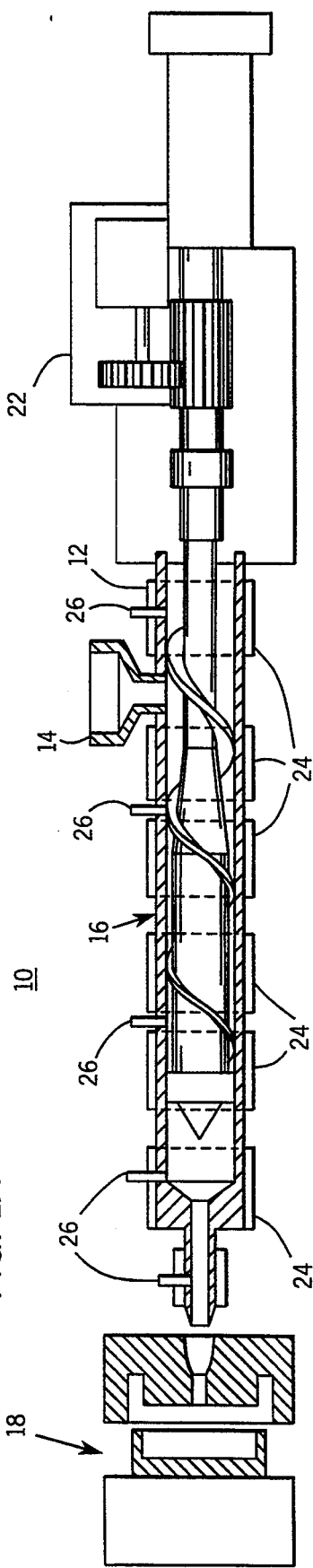
FIGS. 1A and 1B provide diagrammatic side view of an injection molding machine showing, in particular, the feed assembly and barrel of such a machine and a lateral cross-sectional view of the barrel of an injection molding machine showing in particular the location of the heaters and transducers around such a barrel.
Figure 1B:
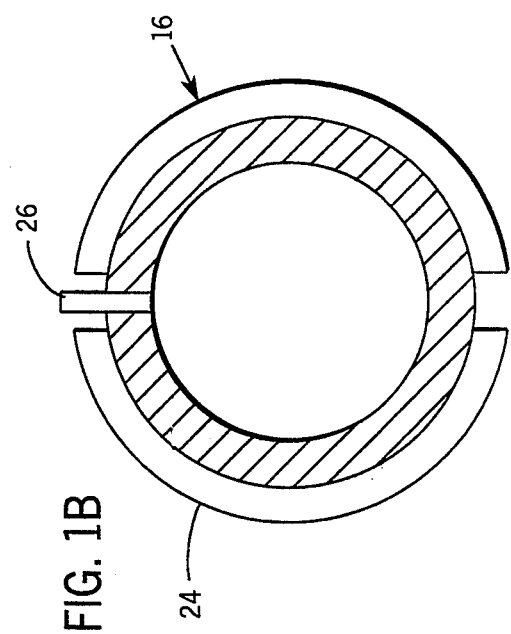

Referring now to FIGS. 1A and 1B, the present invention is used in conjunction with an injection molding machine having a feed assembly 10 which is adapted for melting and feeding plastic materials entering at the funnel 14 down the barrel 16 into the mold 18. The barrel 16 is hollow and contains a spiral feed screw 20 which is driven by a motorized drive assembly 22. As the plastic materials enter the barrel 16 and are transported toward the mold 18 they are heated in accordance with set points (i.e. command temperatures) for the service heating zones of the barrel 16 which are selected to be sufficient to ensure that the plastic materials assume a suitable liquid state for delivery into the mold 18. The barrel 16 is heated by different sets of heater bands 24 located around its outer surface that define separate heating zones which may be independently controlled. Temperatures within the barrel 16 are sensed by temperature transducers 26 which are located at the inner surface of the barrel 16 so that they can provide information on the temperature of the plastic materials within the barrel at the different heating zones.

Figure 2:
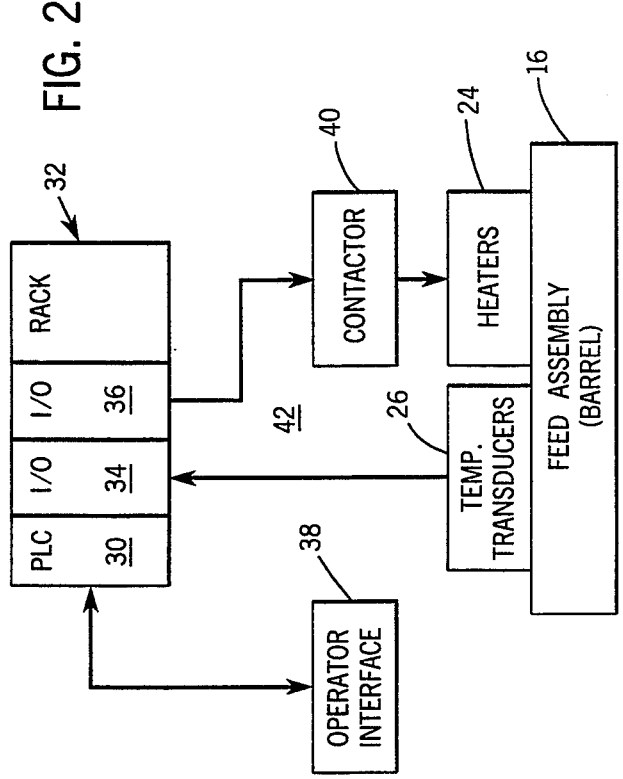
FIG. 2 provides a block diagram view of the control system associated with the feed assembly of an injection molding machine for controlling the temperature within the barrel of the feed assembly.

Referring now to FIG. 2, temperatures within barrel 16 of the injection molding machine 10 are controlled by operation of an electrical control system 42 including a programmable logic controller 30 which executes program code which is specially adapted for temperature control of injection molding machinery. The controller 30 is mounted in an I/O rack 32 and interconnected by a back plane to the I/O modules 34 and 36. The overall functioning of the controller 30 is subject to operator control through the operator interface 38. The controller 30 receives temperature inputs through the I/O module 34 from the transducers 26 installed in the barrel 16 and provides heater command outputs through the I/O module 36 to a set of electrical contactors 40 regulating the power provided to the heaters 24. The power delivered to the heaters 24 is controlled in accordance with a TPO (Time Proportional Output) algorithm for regulating the operation of the contactors 40 in terms of duty cycle in response to heater command values. The electrical control system 42 is adapted for separately controlling the temperature in the heating zones inside the barrel 16 so that they each rapidly and closely approach their set points upon start-up and accurately maintain that temperature on a continuous basis thereafter.

Figure 3:
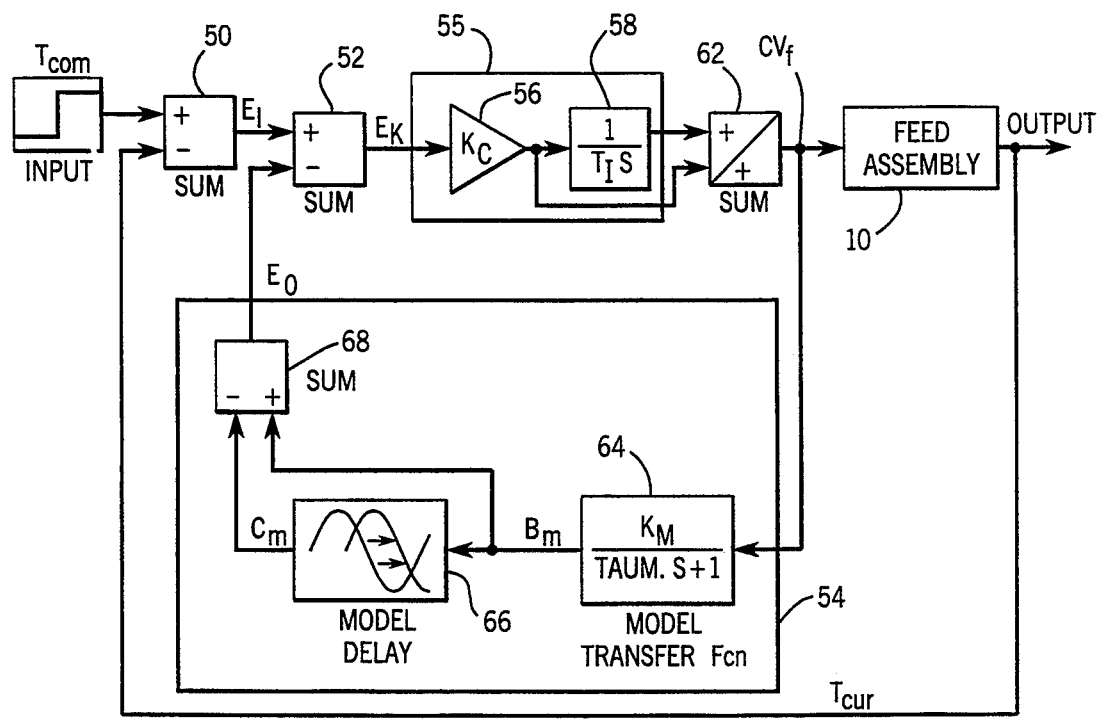
FIG. 3 provides a block diagram view of the steady state feedback control functions which would be executed by a programmable controller under steady state conditions to maintain the temperature of the barrel of an injection molding machine at the command temperature.

Referring now to FIG. 3, a steady state control algorithm is illustrated of the type which can be executed by the controller 30 to maintain the temperature within one of the heating zones of the barrel 16 of the feed assembly 10 once the command temperature is reached. A set point or command temperature $T_{com}$ is input to the summing block 50 where it is differenced with a current temperature $T_{cur}$ provided by one of the transducers 24 in order to generate an error signal $E_1$ for one of the heating zones. The error signal $E_1$ is directed to another summing block 52 where it is differenced with an input from a Smith Predictor 54. In accordance with well known practices, the Smith Predictor provides a feed-forward type signal for improving the responsiveness for the control loop. The summing block 52 generates another error signal $E_K$ which is supplied to the PID steady state controller 55. The signal $E_K$ is directed to a proportional control function 56 and then from the function 56 to an integral control function 58 representing different kinds of functions which may be used by setting the constants $K_C$ and $T_I$ to select the overall control functionality desired. (Note: A derivative control function is not shown but could be implemented.) The outputs of control functions 56 and 58 of the PID controller 55 are added to the steady state heater command value $CV_{SS}$ calculated for maintaining the set point $T_{com}$ at the summing block 62 in order to produce a final heater command value $CV_f$ which results in power being applied to one of the heaters 24 and heat being delivered to one of the zones of the barrel 10. The final heater command value $CV_f$ is also fed to the Smith Predictor 54 where it is operated on by the transfer function 64 to produce an output $B_m$ which is in turn operated on by a delay function 66 to produce an output $C_m$. The output $C_m$ is differenced with the output $B_m$ at the summing block 68 to produce the error signal $E_O$ which is directed to the summing block 52. In accordance with well known principles the transfer function and delay functions represented by blocks 64 and 66 model the transfer and delay functions of the plant (i.e. the injection molding machine feed assembly) being controlled.

Figure 4:
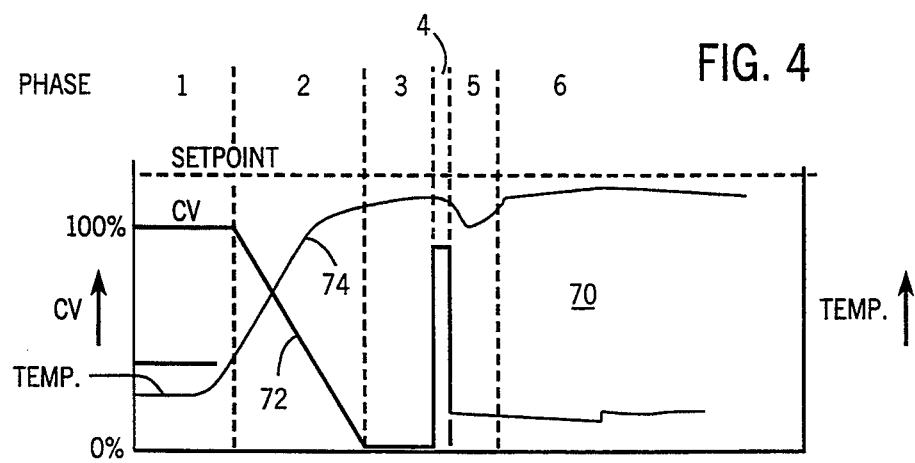
FIG. 4 provides a graphical illustration of the operation of the temperature control system for the present invention in accordance with the six separate phases.

Referring now to FIG. 4, a graph 70 is shown in which the heater command value 72 and a typical heating zone temperature 74 are shown throughout the various phases of cold startup of an injection molding machine. During phase 1 the heater command value is maintained at full power for a limited time. During phase 2 the heater command level is ramped down to zero power as the zone temperature 74 rapidly increases. During phase 3 the heater power is maintained at the zero power level until the zone temperature 74 reaches a maximum and peaks. During phase 4 the heater command value is "spiked" (i.e. maintained at a full power for a short time interval) in order to rapidly drive the zone temperature 74 toward its command temperature. During phase 5 the heater command level is maintained at the calculated steady state value pending the effects of the command value spike executed during phase 4. During phase 6 steady state operations are begun with the heating zone operating under feedback control in accordance with a PI control algorithm or equivalent with or without an associated Smith Predictor control function for closely maintaining the heating zone temperature 74 at its set point.

Figure 5:
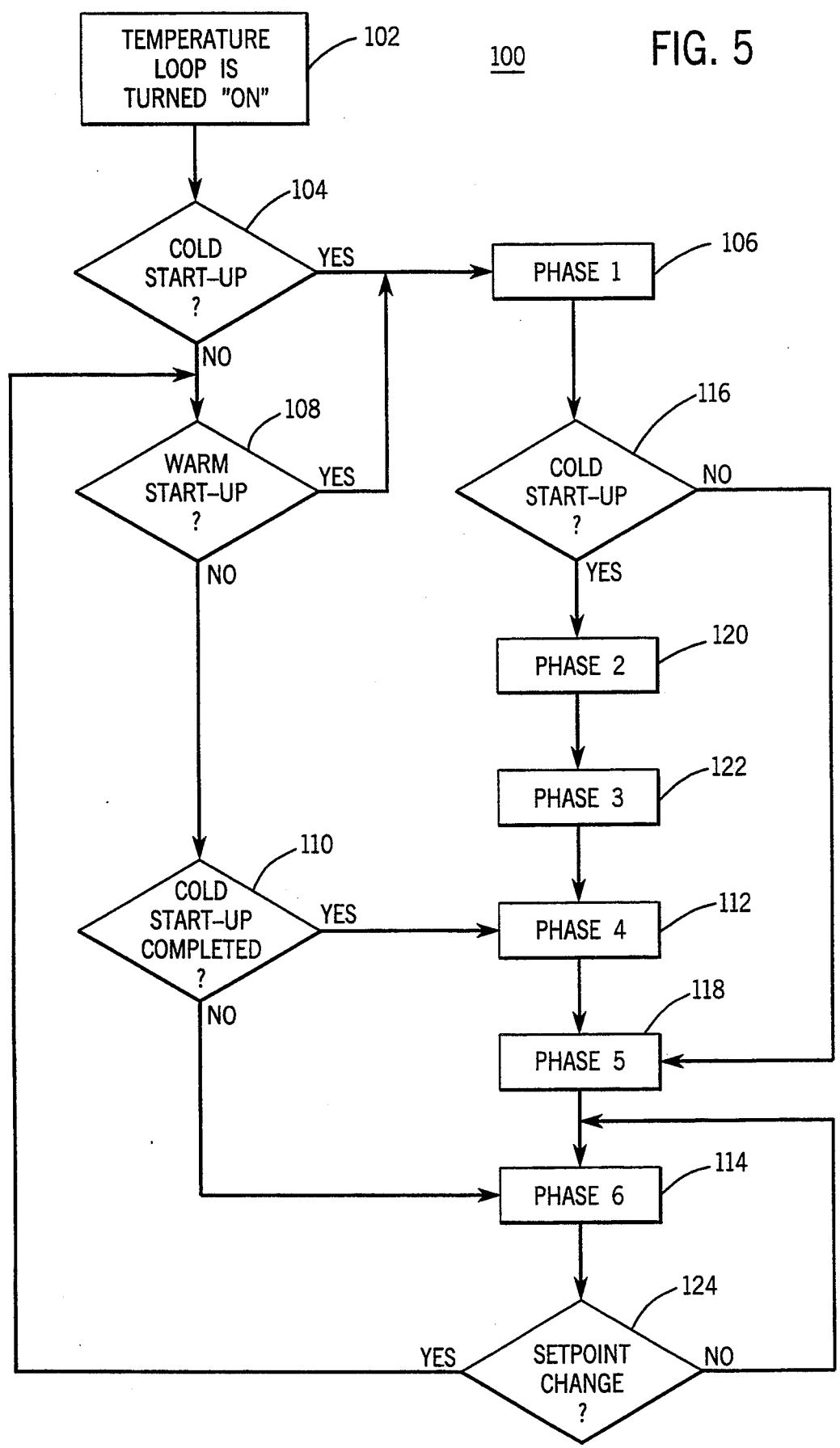
FIG. 5 provides a flowchart illustrating the overall control structure of the temperature control system of the present invention whereby entry into the various phases of the present invention is controlled.

Referring now to FIG. 5, the routine 100 illustrates the overall sequence of steps and phases for temperature control of a feed assembly 10 of an injection molding machine in response to a command temperature. In accordance with step 102 when the temperature control system is activated through the operator interface 38, a cold startup criteria routine 104 is entered and cold startup conditions are verified. If cold startup conditions are present, the program immediately proceeds to a phase 1 routine 106 and otherwise passes to a warm startup criteria routine 108 during which warm startup conditions are verified. If warm startup conditions are present, the program again enters the phase 1 routine 106 but otherwise proceeds to step 110 in which the completion of the cold startup procedure is queried. If the cold startup procedure has been previously completed but the barrel 16 has not reached sufficient temperature, the phase 4 routine 112 is immediately entered so that the temperature can be spiked up to the command temperature and otherwise, if the cold startup procedure has not been completed and temperatures are near to the set point, the phase 6 routine 114 is entered.

Upon completion of the phase 1 routine 106, the results of the cold startup criteria routine 104 are again used in step 116 so that warm startup events can be shunted directly to the phase 5 routine 118. Cold startup events are directed to sequentially proceed through the phase 2-6 routines 120, 122, 12, 118 and 114. In all cases (i.e. warm or cold startup events or set point changes) if the phase 6 routine 114 detects that the system is no longer in steady state conditions, then step 124 is entered and checks are made for indications that the set point has been changed. If the command temperature has been substantially changed, the program is directed back up to step 108 from step 124 to run the warm startup criteria routine 108 which typically would lead to entry of the phase 4 routine at step 112 for execution of a heater command value spike in order to quickly reset the temperature. Alternatively, if the command temperature has not changed, the phase 6 routine 114 is again entered (and repeatedly reentered).

Figure 6:
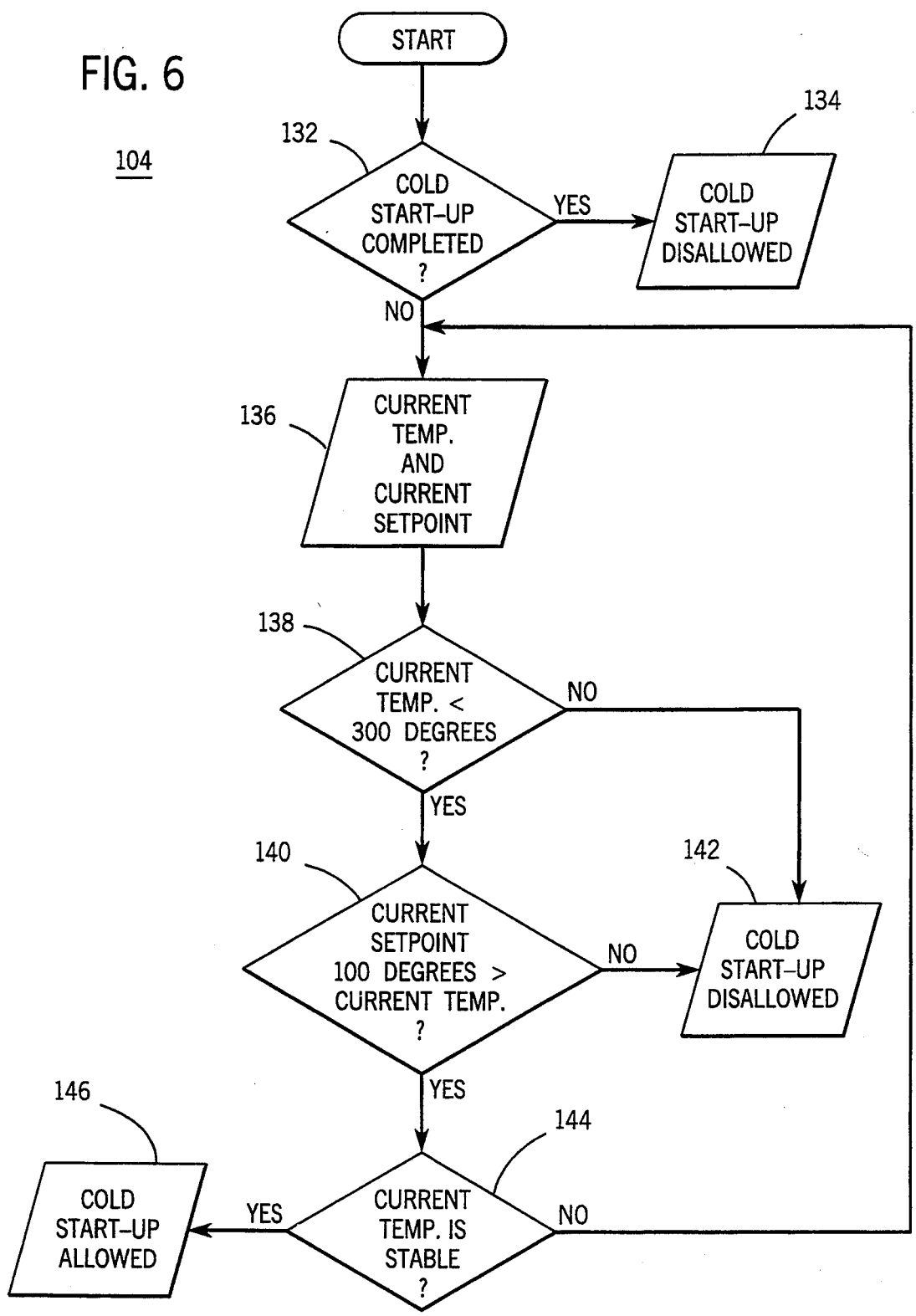
FIGS. 6 and 7 provide flowcharts for the cold startup and warm startup routines which govern various branching decisions within the flow chart of FIG. 5.

Referring now to FIG. 6, the cold start up criteria routine 104 is shown for verifying the existence of conditions appropriate for cold startup. The cold startup criteria routine 104 starts at step 132 as the routine queries whether the cold startup procedure has been previously completed. If a cold startup procedure has been previously completed, a further cold startup procedure is disallowed in accordance with step 134. Otherwise, if a cold startup procedure has not been completed, information is accessed regarding the current temperature and command temperature pursuant to step 136. In accordance with step 138, if the current temperature is less than 300 degrees, the program passes to step 140. Otherwise, if the current temperature is greater than or equal to 300 degrees, cold startup is disallowed as per step 142. In accordance with step 140, if the command temperature is 100 degrees greater than the current temperature, then the program passes to step 144. Otherwise, if the command temperature is not 100 degrees greater than the current temperature, cold startup is again disallowed in accordance with step 142. In accordance with step 144, if the current temperature is also stable (e.g. has not changed by more than 2° within the last 20 seconds), then cold startup is allowed in accordance with step 146, but otherwise the program jumps back to step 136 to acquire new temperature and set point information. Whenever cold startup is disallowed as indicated by steps 134 and 142, the program proceeds to the warm startup criteria routine 108.

Figure 7:
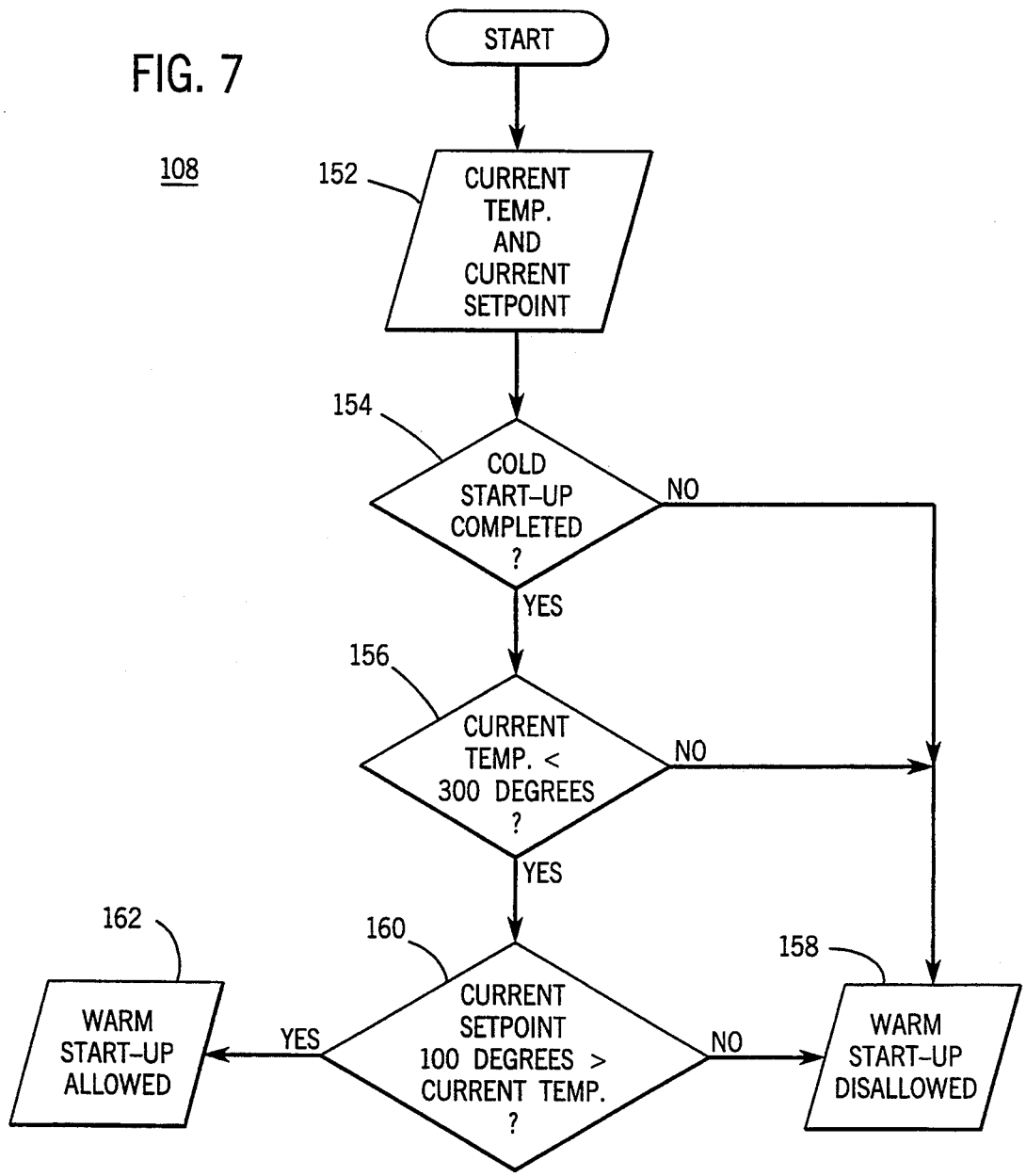

Referring now to FIG. 7, the warm startup criteria routine 108 is shown for verifying the existence of conditions appropriate for warm startup. In step 152 current temperature and command temperature information is accessed and thereafter the program proceeds to step 154. In accordance with step 154 the program checks to see if a cold startup procedure has been previously completed. If a cold startup procedure has been completed, the program proceeds to step 156 but otherwise warm startup is disallowed as per step 158. In accordance with step 56, if the current temperature is less than 300°, the program passes to step 160, but otherwise warm startup is again disallowed as per step 158. In accordance with step 160 if the current set point is not 100° greater than the current temperature, warm startup is disallowed as per step 158. When warm startup is allowed pursuant to step 162, the program proceeds to the phase 1 routine 106 and conversely when warm startup is disallowed pursuant to step 158, the program proceeds to step 110.

Figure 8:
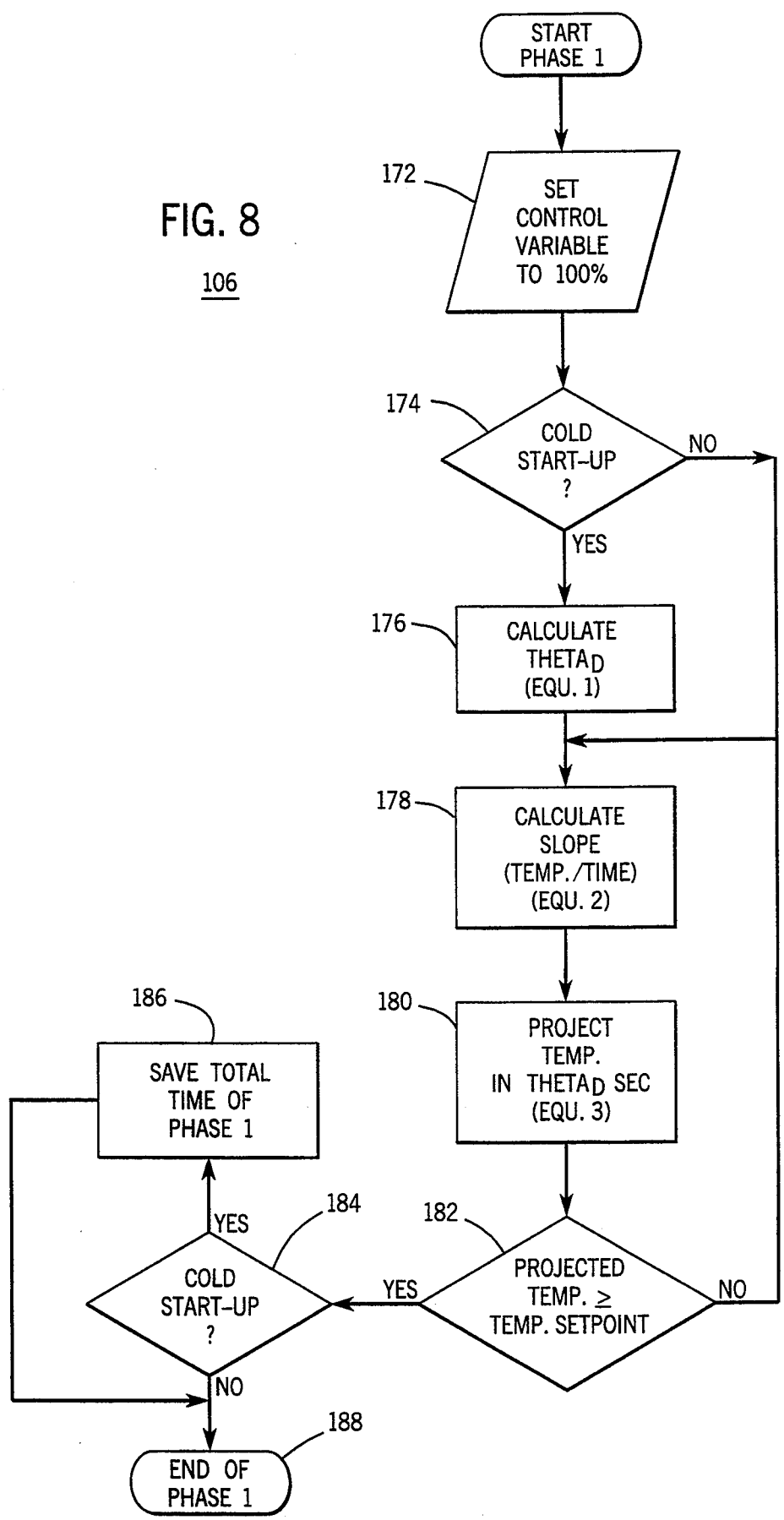
FIGS. 8–12 provide flowcharts for phases 1 through 5 of the present invention showing the various process steps involved in these routines.

Referring now to FIG. 8, the phase 1 routine 106 is shown whereby the temperature of the feed assembly is rapidly brought up to an intermediate temperature selected to be slightly below the command temperature. Pursuant to step 172 the control variable (heater command value) is set to full power then step 174 is entered in which the results of cold startup criteria routine 104 are used in making a branching decision. If cold startup conditions are present, the system dead time period Theta$_D$ is calculated pursuant to step 176 and in accordance with equation 1 below:

$$\text{Theta}_D = \text{time for process temperature to rise } 2° \text{ at full heater power} \quad (1)$$

After the dead time period Theta$_D$ is calculated or if cold startup conditions are not present, the program passes to step 178 in which the Slope of the temperature is calculated in accordance with equation 2 below:

$$\text{Slope} = \text{change in temp./change in time} \quad (2)$$

(Note: changes should be "instantaneous")
After the Slope is calculated the program enters step 180 in which a projected temperature is forecast based on the Slope, system dead time and current temperature T$_{cur}$ in accordance with equation 3 below:

$$T_{p1} = (\text{Slope} * 1.5 \text{Theta}_D) + T_{cur} \quad (3)$$

In accordance with step 182, if the projected temperature T$_{p1}$ is greater than or equal to the command temperature T$_{com}$ the program is directed to step 184, but otherwise the program jumps back to step 178. In step 184 the results of the cold startup criteria routine are again used to direct the program either to step 186, if cold startup conditions are present, or to termination block 188, if cold startup conditions are not present. In step 186 the total time duration of phase one t$_{p1}$ is saved to memory for later use in control parameter calculations and thereafter the routine 101 again ends pursuant to termination block 188. The routine 106 provides a loop comprising steps 178, 180 and 182 for maintaining the heater command value at full power until the projected temperature T$_{p1}$ equals the set point T$_{com}$. Since the projected temperature is a deliberate over-estimate of future temperatures, an intermediate temperature level is always reached without any chance of an overshoot of the command temperature by the feed assembly.

Figure 9:
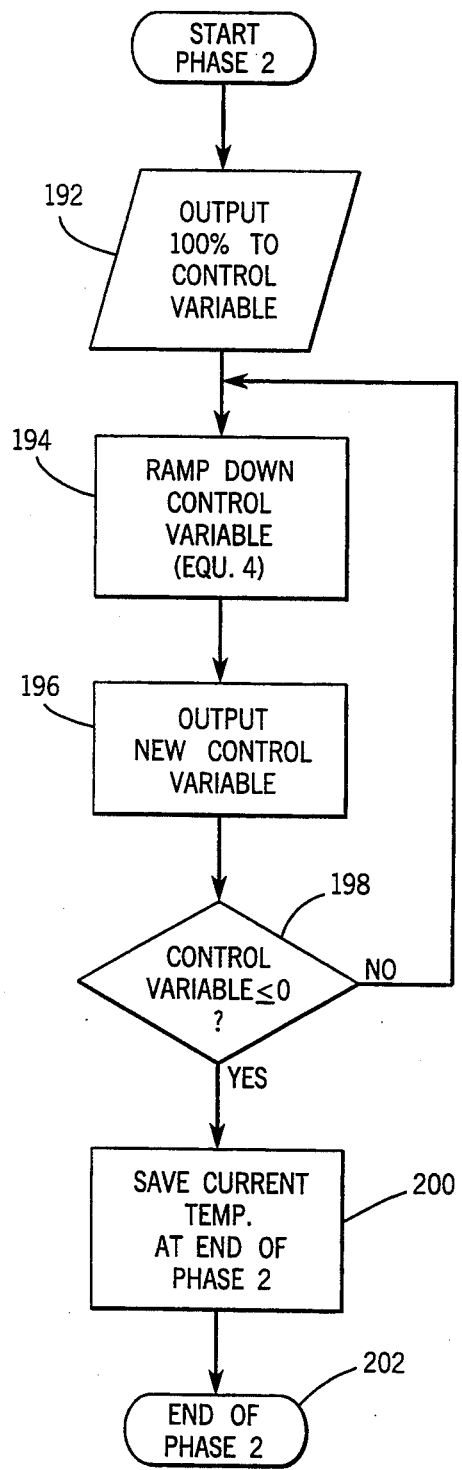

Referring now to FIG. 9, the phase 2 routine 120 for linearly ramping down the heater command value is shown. The routine 120 is entered at step 192 with the heater command value being at full power in accordance with the end of the phase 1 routine. However, step 194 is immediately entered in which a new value of the heater command is calculated in accordance with equation 4 below:

$$CV = 100 - ((t_{p2}/\text{Theta}_D) * 100) \tag{4}$$

$t_{p2}$ = Accumulated time of Phase 2

In step 196 the heater command value calculated in step 194 is output as the new command to the feed assembly heaters and the program thereafter passes to step 198 in which the heater command value is compared to and is less than or equal to zero. If the heater command value has reached zero the program is directed to step 200, but otherwise the program jumps back to step 194 in which a new value for the heater command is calculated. In step 200 the current temperature at the end of phase 2 $T_{p2}$ is saved to memory for later use and the routine 120 is ended in accordance with termination block 202. The phase 2 routine 120 provides a loop comprising steps 194, 196 and 198 whereby the control variable (heater command value) is successively decremented by small amounts so as to be ramped down over a period of time equal to the system dead time.

Figure 10:
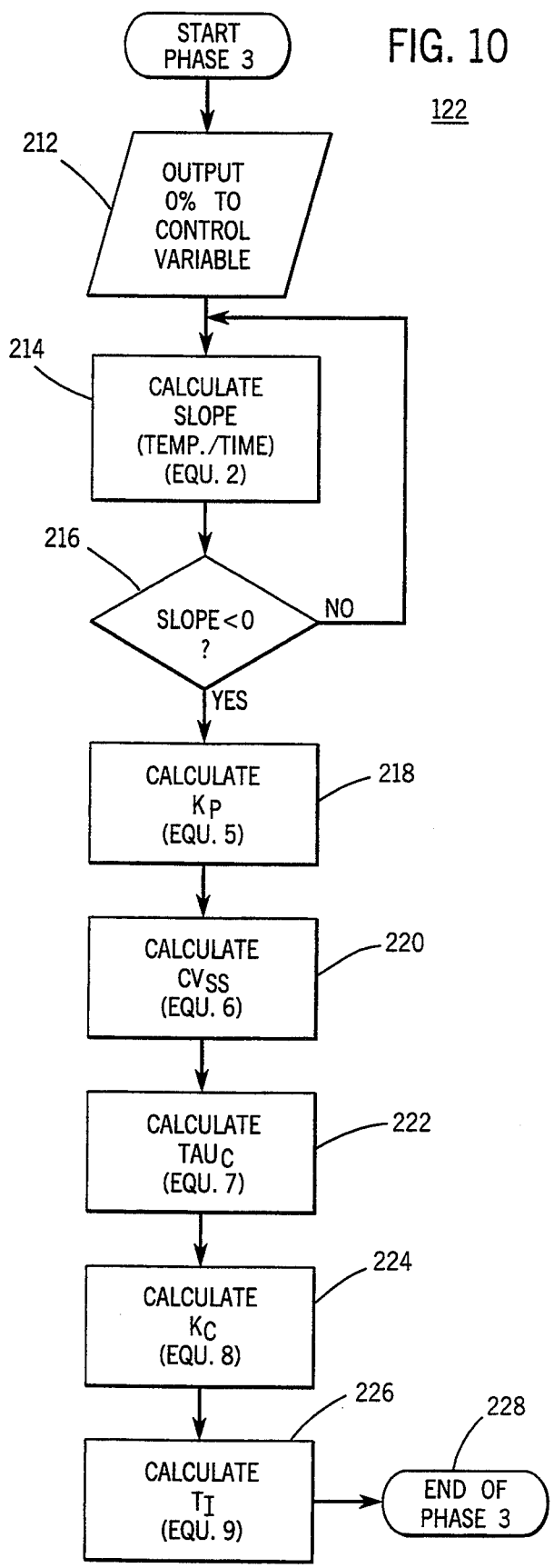

Referring now to FIG. 10 the phase 3 routine 122 is shown for identifying a particular steady state heater command value $CV_{TM}$ corresponding to a particular intermediate temperature $T_{max}$ which can then be used to calculate the system gain and the steady state heater command value $CV_{SS}$ corresponding to the command temperature $T_{com}$. As shown in step 212 the phase 3 routine 122 is entered with the control variable or heater command value at zero in accordance with the end of the phase 2 routine 120. In step 214 the current value of the Slope is calculated in accordance with equation 2. Pursuant to step 216 the value of the Slope is immediately compared to zero. If the value of Slope is still greater than or equal to zero the program jumps back to step 214 and again calculates another new value for the Slope. However, if the Slope has become less than zero, the program immediately proceeds through steps 218, 220, 222, 224 and 226 in which various calculations are made and important system parameters are determined. In step 218 the system gain $K_P$ is calculated in accordance with equation 5 below:

$$K_p = (T_{max} - T_{start})/CV_{TM} \tag{5}$$

$T_{start}$ = feed assembly temperature at start
$T_{max} < T_{cur}$ when Slope=0 at $t_{p3}$
$CV_{TM}$ = heater command value theta$_D$ seconds back from $T_{max}$ at $t_{p3}$
$t_{p3} = t_{sl<0} - (t_{sl=0}/2)$
$t_{sl<0}$ = time at which Slope goes negative
$t_{sl=0}$ = time over which Slope equals zero In step 220 the steady state heater command value corresponding to the command temperature is then calculated in accordance with equation 6 below:

$$CV_{SS} = (T_{com} - T_{start})/K_P \tag{6}$$

In step 222 the system time constant Tau$_C$ is calculated in accordance with equation 7 below:

$$\text{Tau}_c = -(t_{p1})/(\ln(1 - (T_{p2} - T_{start})/(K_P * 100))) \tag{7}$$

In step 224 a portional gain constant $K_C$ is calculated in accordance with equation 8 below:

$$K_C = (0.586/K_P)*(\text{Theta}_D/\text{Tau}_c) - 0.916 \tag{8}$$

Finally, in accordance with step 226, an integral gain constant $T_I$ is calculated in accordance with equation 9 below:

$$T_I = \text{Tau}_c/(1.03 - 0.165*(\text{Theta}_D/\text{Tau}_c)) \tag{9}$$

The routine 122 then ends as indicated by termination block 228. In essence the phase 3 routine 122 waits for the slope of the temperature curve to go to zero and then calculates a heater command value $CV_{TM}$ corresponding to the temperature maximum that was achieved. The resulting information is used in calculating several types of important data characterizing the feed assembly system including control parameters for use in PI control functions under steady state conditions once the command temperature is attained.

Figure 11:
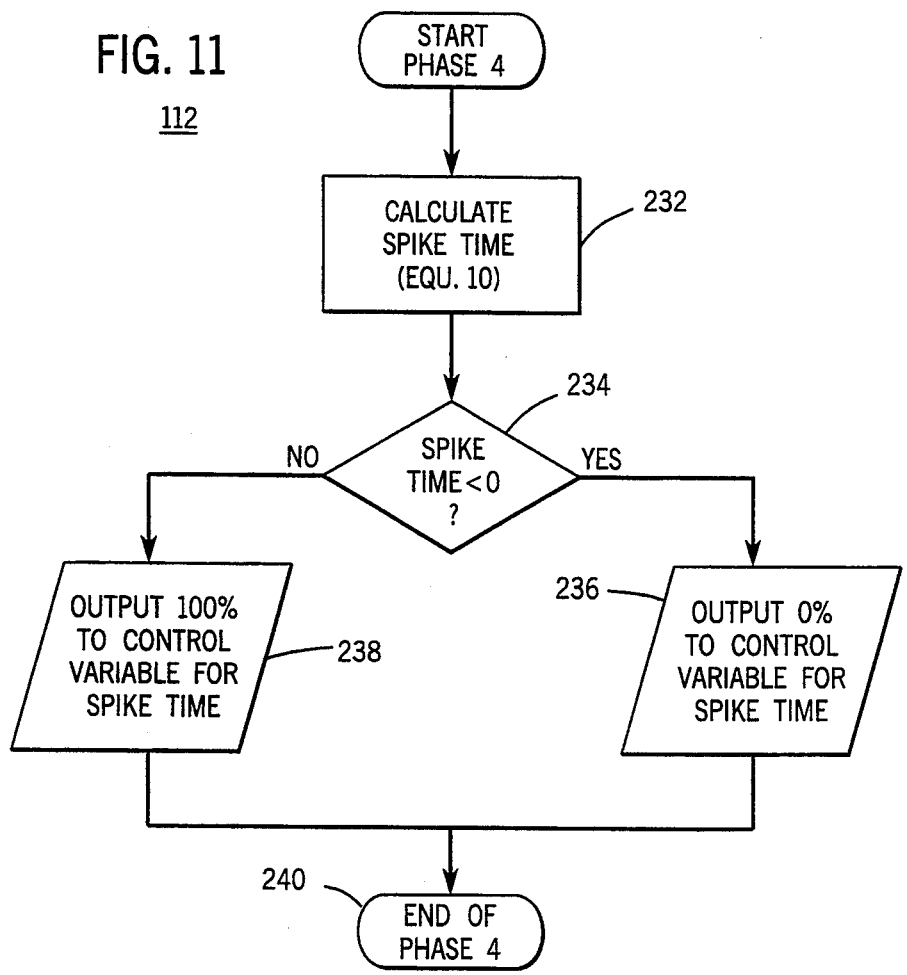

Referring now to FIG. 11, the phase 4 routine 112 is shown in which the heater command value is controlled to provide a "spike" which rapidly and accurately brings the temperature of the feed assembly up to the command temperature. In step 232 the duration of the spike time $T_{p4}$ is calculated in accordance with equation 10 below:

$$t_{p4} = ((CV_{ss} - CV_{AVG})*\text{Theta}_D)/100 \tag{10}$$

$CV_{AVG}$ = average heater command value over last dead time period

The program then passes to step 234 in which the value of the spike time interval $t_{p4}$ is compared with zero. If the spike time interval is less than zero the heater command value is set to zero and a zero heater command output level is maintained for the entire spike time interval as indicated in step 236. However, if the spike time interval $t_{p4}$ is greater than or equal to zero, the heater command value is set to 100% and maintained at 100% for the entire spike time interval as shown in step 238. After either step 236 or step 238 phase 4 ends in accordance with termination block 240. The phase 4 routine 112 calculates the required spike time to allow the current temperature of the feed assembly to be rapidly brought up to the set point and implements the necessary heater command values in accordance with the outcome of these calculations.

Figure 12:
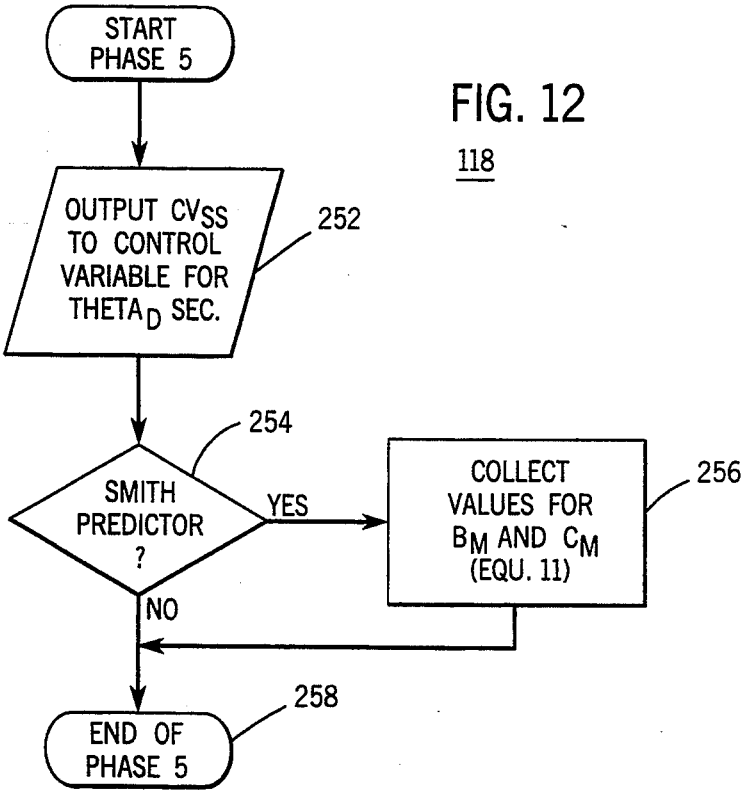

Referring now to FIG. 12, the phase 5 routine 118 is shown for allowing the feed assembly to respond to the heater command values executed during phase 4. In accordance with step 252 the heater command value is set to the steady state command value $CV_{ss}$ corresponding to the command temperature $T_{com}$ and maintained constant at that level for a period equal to the system dead time Theta$_D$. After step 252 is completed the program checks to see if a Smith Predictor is to be used as the part of the steady state feedback control mechanism. If a Smith Predictor is to be used, the program branches to step 256 in which it collects values for the terms $B_m$ and $C_m$ in accordance with equations 11 below:

$$dB_m = (K_P*CV_{ss} - B_m)/\text{Tau}_c$$

$$B_m = B_m + dB_m*dt \tag{11}$$

$C_m = B_m$ (Theta$_D$ seconds ago)
dt = sample period

After step 256 is completed or, if a Smith Predictor is not being used as a part of the steady state control mechanism, the phase 5 routine 118 ends in accordance with termination block 258.

Figure 13:
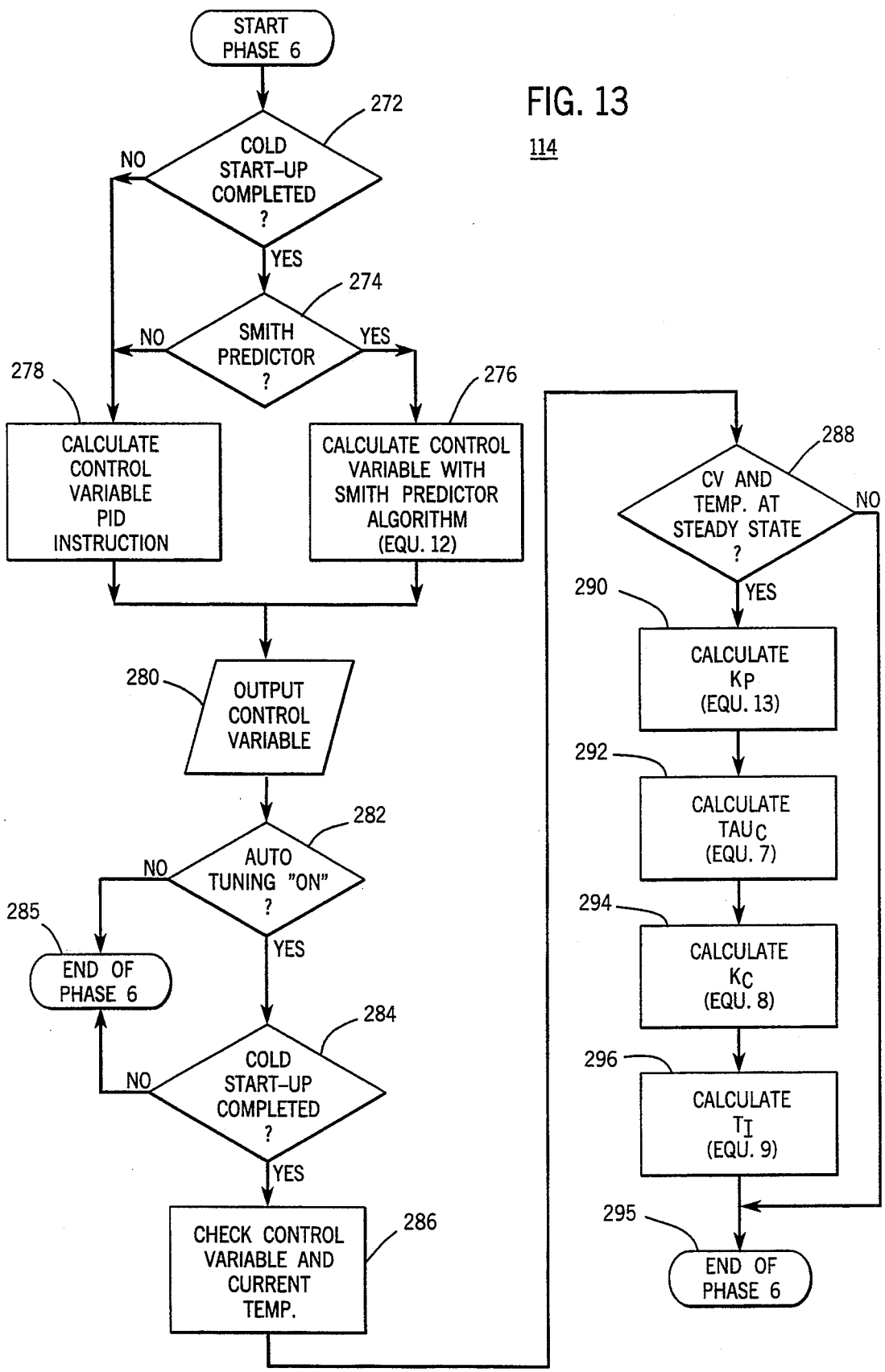
FIG. 13 provides a flowchart for phase 6 of the present invention whereby temperature control is maintained under steady state conditions.

Referring now to FIG. 13, the phase 6 routine 114 is shown for conducting temperature control operations under steady state conditions. In step 272 the program queries whether a cold startup procedure has been completed. If a cold startup procedure has been completed, the routine 114 proceeds to step 274 in which it queries whether the operator has designated the use of a Smith Predictor under steady state conditions. If the operator has designated use of a Smith Predictor, the program executes step 276 in which it calculates the heater command control variable using the Smith Predictor algorithm as shown in equations 12 below:

$$E_1 = T_{com} - T_{cur}$$

$$E_0 = B_M - C_M$$

$$E_K = E_1 - E_O$$

$$CV(s)/E(s) = K_C(1 + 1/T_I s) \tag{12}$$

(Please note that the above equation can be implemented as $CV_f = CV_{t-1} + K_C * (dE_K + dt * E_K/T_I)$ where:
dt = sample period and
$CV_{t-1} = CV_f$ at previous sample period)

If the cold startup procedure has not been previously completed or the operator has not designated operation using a Smith Predictor, the program executes step 278 in which it calculates the heater control variable using PID instructions which provide default values for the required proportional and integral control function constants. After execution of either step 276 or step 278, the routine 114 outputs a heater command (control variable) to the contactor 40 in accordance with step 280. The program then proceeds to step 282 in which queries whether the operator has designated the use of an autotuning function. If the operator has not designated use of an autotuning function, phase 6 immediately ends at termination block 285, but otherwise the program proceeds to step 284 in which completion of a cold startup procedure is again queried. If a cold startup procedure has been completed, the program executes step 286 and checks the value of the heater command control variable and the current temperature. Otherwise, if a cold startup procedure has not been completed, the phase 6 routine 114 ends immediately after step 284 at block 285. After the required heater command and current temperature data has been acquired pursuant to step 286, the program enters step 288 in which it executes a steady state conditions routine 300 in order to verify the existence of steady state conditions with respect to the control variable and current temperature. If steady state conditions exist, the routine 114 then proceeds to steps 290, 292, 294 and 296 whereby it calculates (or rather recalculates) values for the system gain, system time constant, proportional gain constant and integral gain constant. The system gain $K_P$ is recalculated in accordance with equation 13 below:

$$K_P = T_{cur}/CV_{ss} \tag{13}$$

The system time constant $Tau_C$ is calculated in accordance with equation 7. The proportional gain constant $K_C$ is calculated in accordance with equation 8. The integral gain constant $T_I$ is calculated in accordance with equation 9. The routine 114 then ends at termination block 295. If the existence of steady state condition cannot be verified, the phase 6 routine 114 ends immediately after step 288 at block 295. The routine 114 configures the temperature control system for the use of different types of control mechanisms under steady state conditions in accordance with the designations of the system operator.

Figure 14:
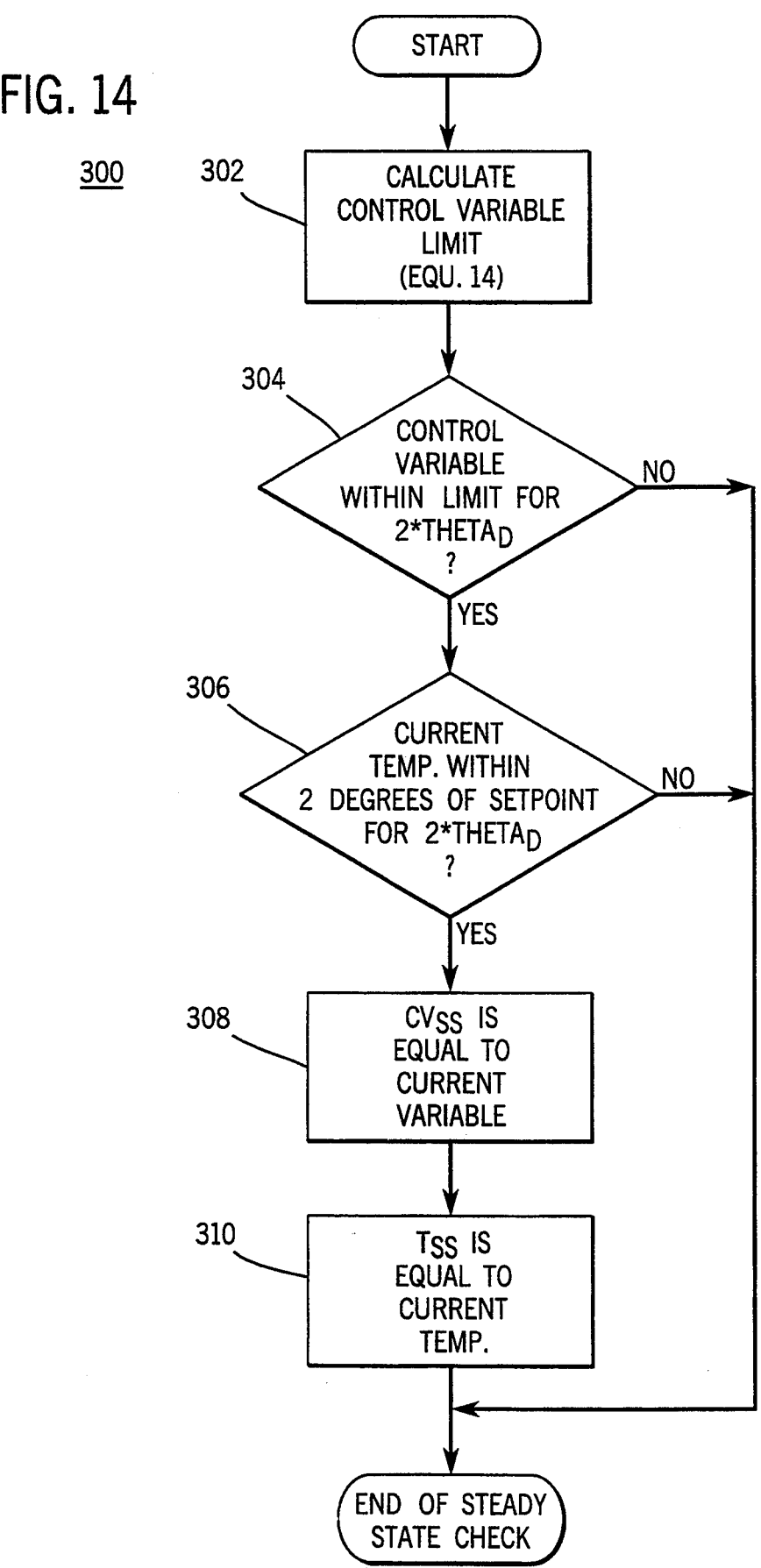
FIG. 14 provides a flowchart for the steady state condition routine whereby the existence of steady state conditions can be verified for governing branching decisions in the flowchart of FIG. 13.

Referring now to FIG. 14, the steady state conditions routine 300 begins at step 302 with the calculation of a control variable limit as a function of a system gain in accordance with equation 14 below:

$$CV_{LIM} = 2/K_P \tag{14}$$

The routine 300 then proceeds to step 304 in which it determines whether the value of the final heater command $CV_f$ has remained within the control variable limit $CV_{LIM}$ for at least two dead time periods. If the final heater command $CV_f$ has remained within the control variable limit, the program then executes step 306 in which it determines whether the current temperature $T_{cur}$ has remained within 2° of the command temperature $T_{com}$ for at least two dead time periods. The program proceeds to steps 308 and 310 in which it updates the control variable (heater command value) to be the final heater command $CV_f$ and updates the current temperature. The routine 300 then ends and the program proceeds to further steps in the phase 6 routine 114. If, on the other hand, it is determined in steps 304 or 306 that the final heater command $CV_f$ has not remained within the control variable limit or the current temperature has not remained within 2° of the set point, the routine 300 is ended and the phase 6 routine 114 is also terminated pursuant to block 295.

We claim:
1. A method for controlling temperature within a process machinery system characterized by a system dead time period $Theta_D$ in order for said machinery system to rapidly and closely approach a command temperature $T_{com}$ upon cold startup from a cold start-up temperature $T_{start}$, comprising the steps of:
   a) turning on and running one or more heaters within said machinery system at a first high power level for a limited time period $t_{p1}$ so that the temperature within the machinery system rapidly approaches an intermediate temperature selected to fall below the command temperature $T_{com}$;
   b) ramping down the power applied to said heaters to a low power level and running said heaters at said low power level until the temperature of said machinery system attains a temperature maximum $T_{max}$;
   c) determining a steady state heater command value $CV_{ss}$ necessary to maintain the machinery system at approximately the command temperature $T_{com}$, the determination of the steady state heater command value $CV_{ss}$ being based on the time at which the temperature maximum $T_{max}$ is attained, the system dead time period $Theta_D$, and a steady state heater command value $CV_{TM}$ which corresponds to the temperature maximum $T_{max}$; and
   d) turning on the heaters within said machinery system at a second high power level for a short time interval $t_{p4}$, the length of which is based on said steady state heater command value $CV_{ss}$, said temperature maximum $T_{max}$, said command tempera- ture $T_{com}$, the cold start-up temperature $T_{start}$ of the machinery system and said system dead time period $Theta_D$ so that the temperature within said machinery system rapidly and closely approaches said command temperature $T_{com}$.

2. The method of claim 1, wherein said limited time period $t_{p1}$ at the first high power level is controlled so as to stop upon satisfaction of the condition:

$$T_{com} = (\text{Slope} * 1.5 Theta_D) + T_{cur},$$

where:
  Slope = change in machinery system temperature/change in time; and
  $T_{cur}$ = latest machinery system temperature.

3. The method of claim 1, wherein said short time interval $t_{p4}$ during which the heaters are turned on at the second high power level is based on an averaged control value $CV_{AVG}$ of previous heater command values which controlled the power level applied to said heaters during the last dead time period immediately prior to said short time interval $t_{p4}$.

4. The method of claim 1, further including the steps of:
  e) determining a system gain $K_P$ and a system time constant $Tau_C$ in addition to said system dead time period $Theta_D$ on the basis of measured time and temperature responses of said machinery system during steps a–d;
  f) using said system gain $K_P$, said system time constant $Tau_C$ and said system dead time period $Theta_D$ to determine one or more feedback control parameters; and
  g) controlling the power applied to said heaters in accordance with said feedback control parameters in order to accurately maintain said machinery system at said command temperature $T_{com}$.

5. The method of claim 3 wherein the short time interval $t_{p4}$ during which the heaters are turned on at the second high power level is determined in accordance with the equation:

$$t_{p4} = (CV_{ss} - CV_{AVG}) * Theta_D/100,$$

where:
  $CV_{ss} = CV_{TM}(T_{com} - T_{start})/(T_{max} - T_{start})$.

6. A method of determining parameters for use in autotuning a temperature controller in a materials handling system which forms a part of an injection molding machine, the temperature controller being utilized during and in conjunction with startup of said materials handling system, comprising the steps of:
  a) turning on and running one or more heaters installed on said materials handling system at a high power level for a limited time period $t_{p1}$ in order to raise a measured system temperature of said materials handling system up to an intermediate temperature below a predetermined command temperature $T_{com}$, and simultaneously identifying a system dead time period $Theta_D$ based on response of the system temperature with respect to time;
  b) ramping down the power applied to said heaters to a zero power level and maintaining the zero power level in order to determine a steady state heater command value $CV_{TM}$ corresponding to a measured temperature maximum $T_{max}$ attained while said heaters are maintained at the zero power level, and simultaneously determining a system time constant $Tau_C$ and a system gain $K_P$ based on said response of the system temperature with respect to time;
  c) running said heaters at said high power level for a short time interval $t_{p4}$ based on the difference between the command temperature $T_{com}$ and an ambient temperature value $T_{start}$, the system gain $K_P$ and the system dead time period $Theta_D$ in order to rapidly raise said system temperature up to approximately said command temperature $T_{com}$; and
  d) using the system dead time period $Theta_D$, the system gain $K_P$ and the system time constant $Tau_C$ to set feedback control parameters for accurate steady state control of said system temperature at said command temperature $T_{com}$.

7. The method of claim 6, wherein said system dead time period $Theta_D$ is determined based on the length of time necessary for the system temperature to change approximately 2° F. when said heaters are turned on during $t_{p1}$ at the high power level.

8. The method of claim 6, wherein said system gain $K_P$ is determined in accordance with the equation $K_P = (T_{max} - T_{start})/CV_{TM}$.

9. The method of claim 8, wherein said short time interval $t_{p4}$ is calculated in accordance with the equation:

$$t_{p4} = (CV_{ss} - CV_{AVG}) * Theta_D/100,$$

where:
  $CV_{ss} = (T_{com} - T_{start})/K_P$; and
  $CV_{AVG}$ = average of heater command values over the last dead time period.

10. In a temperature control system for controlling the temperature within a materials handling assembly which forms a part of an injection molding machine and which is utilized for feeding plastic materials into a mold, said temperature control system having a set of heaters, one or more temperature detectors and a programmable controller for regulating the operation of said heaters in response to temperature information from said temperature detectors to attain and maintain a command temperature $T_{com}$, the improvement comprising:
  a) means for controlling the power applied to said heaters to maintain the power applied to said heaters at a high power level for a limited period $t_{p1}$ in order to rapidly raise the temperature of said materials handling assembly to an intermediate temperature;
  b) means for controlling the power applied to said heaters for ramping down the power applied to said heaters to a zero power level and maintaining the power applied to said heaters at the zero power level until the temperature of said materials handling assembly peaks at a temperature maximum $T_{max}$;
  c) means for identifying a system dead time period $Theta_D$ for the temperature control system and a steady state heater command value $CV_{TM}$ corresponding to said temperature maximum, and for calculating a system gain $K_P$ for the temperature control system based on said temperature maximum $T_{max}$, a measurement of ambient temperature and said steady state heater command value $CV_{TM}$; and
  d) means for controlling the power applied to said heaters at said high power level for a short time interval $t_{p4}$ in direct proportion to said command temperature $T_{com}$ and said system dead time period $Theta_D$, and in inverse proportion to said system gain $K_P$ in order to spike the temperature of said materials handling assembly up to said command temperature $T_{com}$.

11. The improvement of claim 10, further including:
e) means for determining a system time constant $Tau_C$ associated with said materials handling assembly;
f) means for determining feedback control parameters based on said system gain $K_P$, said system dead time period $Theta_D$, and said system time constant $Tau_C$; and
g) means for controlling the power applied to said heaters in response to said temperature information from said temperature detectors in accordance with said feedback control parameters.

12. The improvement of claim 10, wherein the length of said limited time period $t_{p1}$ is controlled to come to an end upon satisfaction of the condition:

$$T_{com} = (Slope * 1.5 Theta_D) + T_{cur},$$

where:
Slope = change in materials handling assembly temperature with respect to time; and
$T_{cur}$ = latest measurement of materials handling assembly temperature.

13. The improvement of claim 10, wherein the short time interval $t_{p4}$ during which the heaters are turned on at said high power level is determined in accordance with the equation:

$$t_{p4} = (CV_{ss} - CV_{AVG} * Theta_D / 100,$$

where:
$CV_{ss} = (T_{com} - T_{start})/K_P$;
$T_{start}$ = ambient temperature; and
$CV_{AVG}$ = average of heater command values over last dead time period.

14. The improvement of claim 11, wherein said temperature detectors comprise transducers.

* * * * *